United States Patent

Rasky et al.

[11] Patent Number: 5,811,168
[45] Date of Patent: Sep. 22, 1998

[54] DURABLE ADVANCED FLEXIBLE REUSABLE SURFACE INSULATION

[75] Inventors: Daniel Rasky, Palo Alto; Demetrius A Kourtides, Gilroy; Daniel L. Dittman, Hayward; Marc D. Rezin, Mountain View; Clement Hiel, San Jose; Wilbur C. Vallotton, Los Gatos, all of Calif.

[73] Assignee: The United States of America as represented by the Administrator of the National Aeronautics and Space Administration, Washington, D.C.

[21] Appl. No.: 598,738

[22] Filed: Jan. 19, 1996

[51] Int. Cl.⁶ ........................................................ B32B 5/12
[52] U.S. Cl. ........................... 428/102; 442/6; 442/18; 442/31; 442/246; 442/247; 442/262
[58] Field of Search ............................. 428/102; 442/6, 442/16, 18, 31, 246, 247, 262

[56] References Cited

U.S. PATENT DOCUMENTS

| | | |
|---|---|---|
| 3,007,596 | 11/1961 | Matsch . |
| 3,018,016 | 1/1962 | Hnilicka, Jr. . |
| 3,152,003 | 10/1964 | Wilson . |
| 3,274,788 | 9/1966 | Hoffman et al. . |
| 4,438,168 | 3/1984 | Testard . |
| 4,925,134 | 5/1990 | Keller et al. . |
| 5,028,397 | 7/1991 | Merry . |
| 5,038,693 | 8/1991 | Kourtides et al. . |
| 5,098,795 | 3/1992 | Webb et al. . |
| 5,277,959 | 1/1994 | Kourtides et al. . |
| 5,296,288 | 3/1994 | Kourtides et al. . |
| 5,310,592 | 5/1994 | Baker et al. . |

Primary Examiner—James J. Bell
Attorney, Agent, or Firm—Kathleen Dal Bon; Harry Lupuloff; John G. Mannix

[57] ABSTRACT

An improved flexible blanket includes a nickel-based alloy foil layer brazed to a nickel-based alloy fabric layer. The fabric layer is stitched to an underlying ceramic insulation layer.

14 Claims, 10 Drawing Sheets

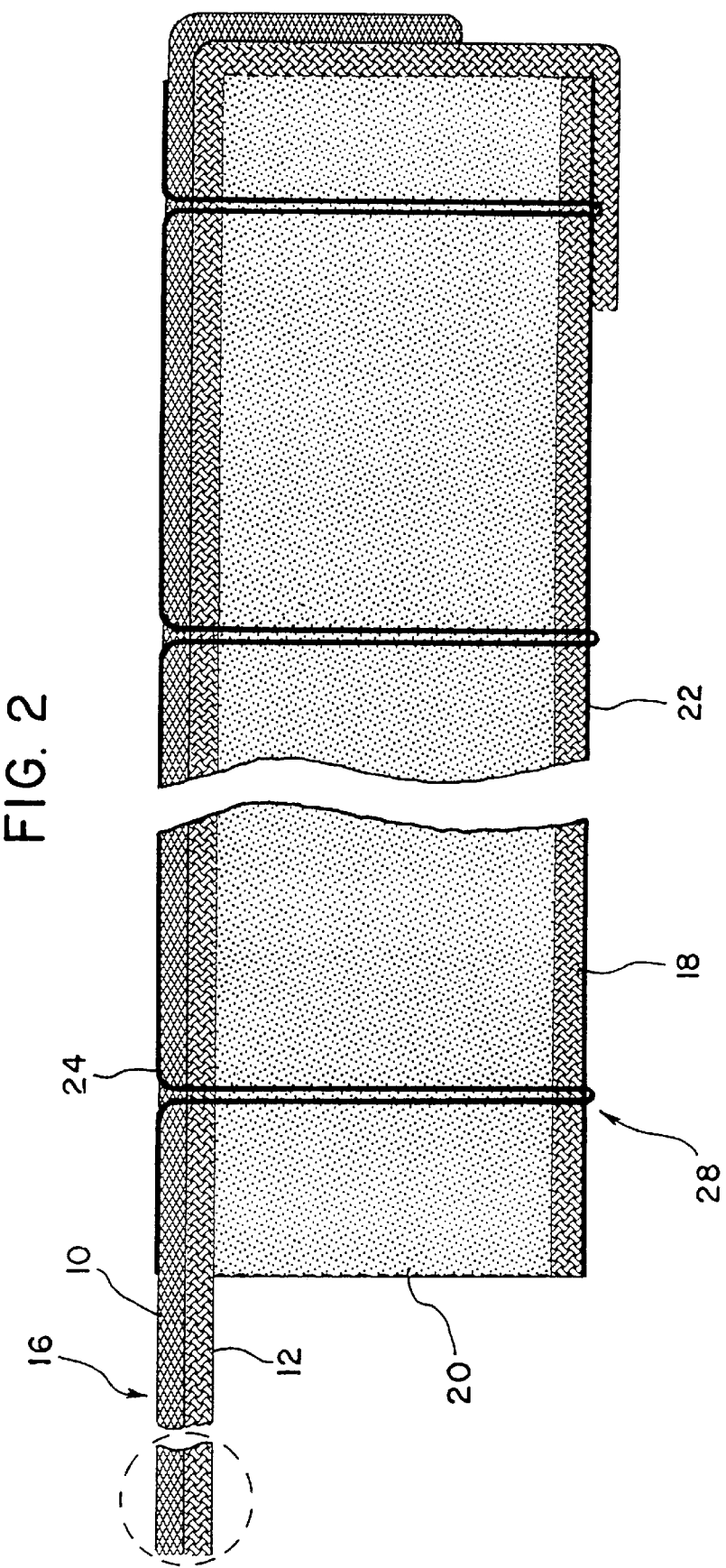

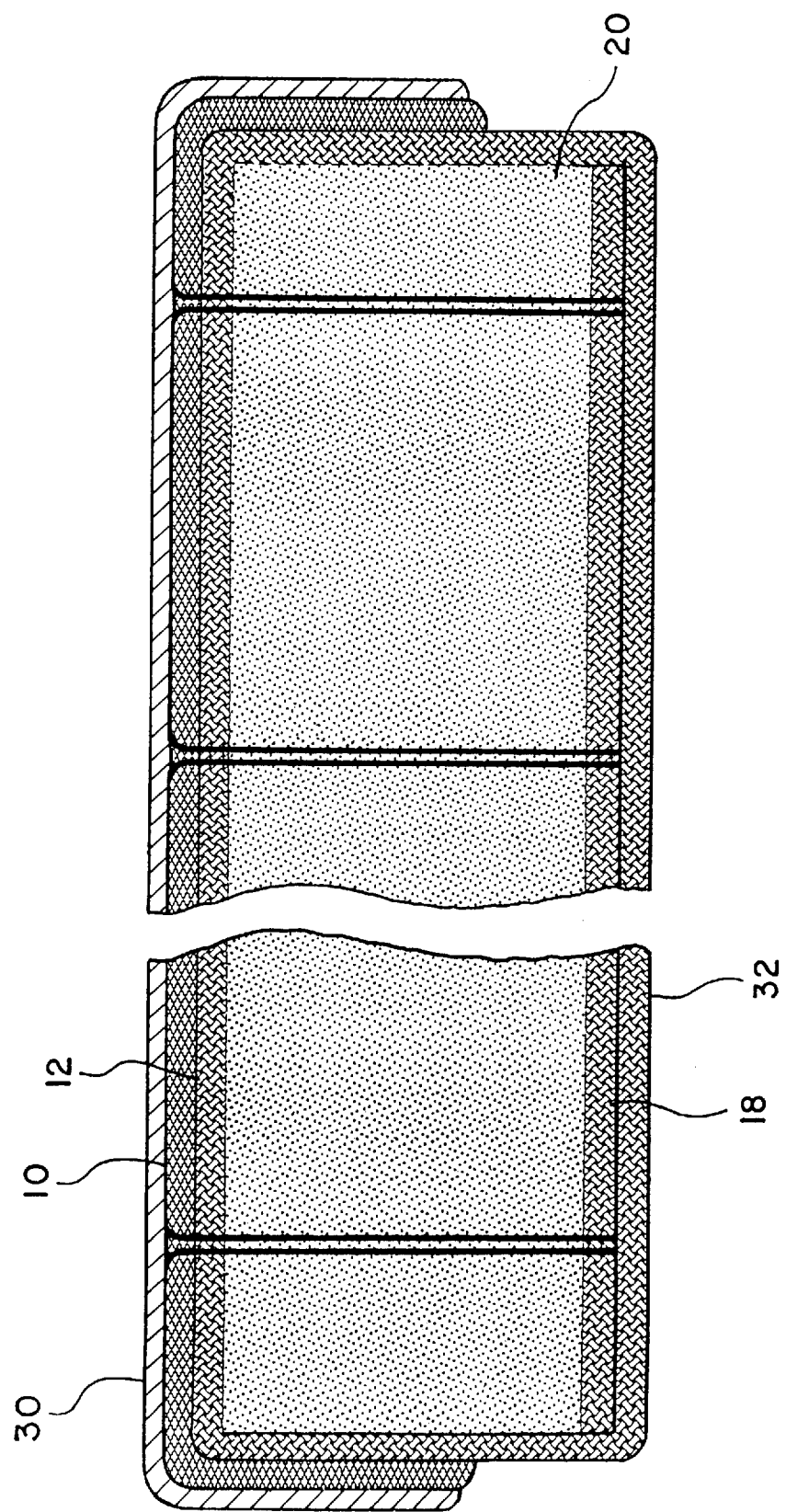

DURABLE ADVANCED FLEXIBLE REUSABLE SURFACE INSULATION

ORIGIN OF THE INVENTION

The invention described herein was made in the performance of work under a NASA contract and is subject to Public Law 96-517 (35 U.S.C. 200 et seq.). The contractor has not elected to retain title to the invention.

FIELD OF THE INVENTION

The present invention relates generally to composite materials used as insulation, and a method for closing out the edges. More specifically, it relates to an improved flexible blanket insulation comprised of a nickel-based superalloy foil as a top surface, brazed to a nickel-based superalloy screen which is attached to ceramic insulation using a ceramic thread, such insulation closed out on the edges in such a manner to minimize water penetration, heat flow, and aerodynamically smooth transition of the top surface.

BACKGROUND OF THE INVENTION

The aerospace and other industries have myriad uses for light weight, highly thermo-resistant flexible insulations. A particular type of material, known as silica fibrous insulation, is described at 6:793 Ceramic Eng. Sci. Proc. (1985). Materials of this type have been found to provide, for many environments, adequate thermal protection of the insulated structure. There remains room for improving these materials, since in some instances they are vulnerable to water absorption and physical damage during routine maintenance operation. This is believed to be attributable to the top ceramic fabric's susceptibility to tearing and breakage.

Composite flexible blanket insulations are described in U.S. Pat. No. 5,277,959 to Kourtides et al. The material includes interlocked silicon carbide fabric and multiple alternating layers of single aluminized foil and/or honeycomb patterned foil.

U.S. Pat. No. 5,038,693 to Kourtides et al. describes a multi-layered insulation material having alternating layers of metal foil and scrim ceramic cloth or vacuum metallized polymeric films quilted together with ceramic thread.

In the past, attempts have been made to use active metals and alloys (Ti, Zr, Hf, Al, Si, Mn, Be, or Li) with fluxing agents to bond metal alloy foils directly to ceramic fabrics. However, these attempts have had less than satisfactory results due to chemical interactions between the ceramic fabric and the braze alloy, lack of wetting of the ceramic fabric, and the difference in the coefficient of thermal expansion of the brazing alloys and the ceramic fabric. Other factors contribute to the failure of the metal/ceramic bond when exposed to a high aero-convective heating environment. These include adverse braze alloy/ceramic fabric reactions such as dissolution and precipitation of undesirable phases. Several publications on metal matrix composites warn of the dissolution of ceramic particulates in active metals. See, for example, p. 19, *Journal of Metals*, March 1984.

While the insulation materials described in the aforementioned Kourtides et al. references have achieved certain advantages, a continuing need exists for materials that are more durable and resistant to damage.

SUMMARY OF THE INVENTION

An object of the present invention is to provide a thermal protection system for specific heating environments which contain conductive, convective, and/or radiative heating components.

Another object of the present invention is to provide an insulation material that is flexible, light weight, and highly thermo-resistant.

Still another object of the invention is to provide a thermal protection system having improved durability while providing adequate thermal protection to structures subjected to multiple cycles of aeroconvective heating.

Still another object of the invention is to provide a method for closing out the edges of these insulations to minimize water intrusion in the insulations, to prevent heat flow to the bottom surface of the insulation, to provide a smooth aerodynamic surface at the point where blankets are adjacent to each other and to permit the thermal expansion of the top foil during heating without buckling of the top surface.

These and other objects are met by providing a flexible blanket insulation which includes a fibrous ceramic batting, a non-fibrous metallic layer stitched to a surface of the fibrous ceramic batting, a metallic foil layer brazed to an outer surface of the non-fibrous metallic layer, and a snap on seal or shingle design to close out these insulations.

Other objects, advantages and salient features of the invention will become apparent from the following detailed description, which taken in conjunction with the annexed drawings, discloses preferred embodiments of the invention.

BRIEF DESCRIPTION OF THE DRAWINGS

FIG. 2 is a cross sectional view of the flexible blanket insulation of FIG. 1, taken along line II—II;

FIG. 4 is a cross-sectional, similar to FIG. 2, but with the metallic foil layer brazed thereto, and after closing out;

DETAILED DESCRIPTION OF THE INVENTION

Figure 1:
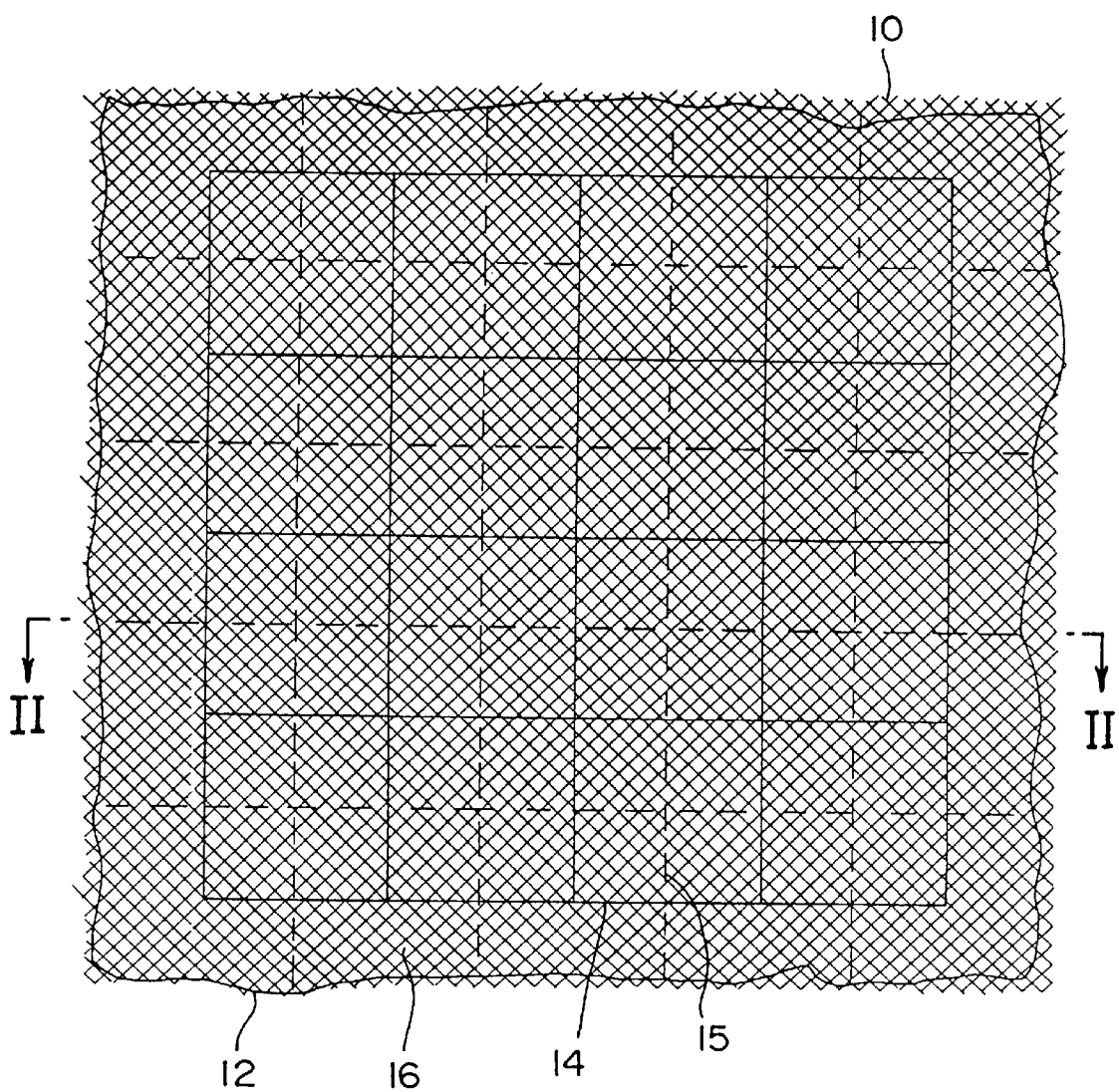
FIG. 1 is a plan view of a flexible blanket insulation according to the present invention, prior to attachment of the foil layer.

FIG. 1 shows, in a plan view, an incomplete assembly of the present invention. A metal alloy or metallic fabric layer 10 is stitched with ceramic thread to a ceramic fabric layer 12. As seen in FIG. 1, a solid-line grid 14 represents the stitching pattern used to stitch together the various layers of the blanket insulation, while the broken-line grid 15 represents the stitching pattern used to stitch the metallic fabric layer 10 to the assembly.

The stitching patterns represented by grids 14 and 15 are preferably interlaced, as shown, such that alternating rows are from alternating grids. The periphery of the stitching pattern 14 defines the area of the underlying insulation layer (to be described below), and the area outside the stitching pattern defines a closeout extension 16. This area is used during the close-out phase of assembly, and may be used to conform to the sides of the blanket insulation after assembly of the various layers.

The metallic fabric layer 10 is preferably made of metallic wire woven to form a screen. For example, the metallic fabric layer 10 could be made of woven INCONEL wire, having a plain weave pattern of 0.0031 inch diameter monofilament INCONEL 600, 601, 617, or 625 wire. INCONEL is commercially available from Inco Alloys International of Huntington, W. Va. USA. Other superalloys or metal alloys or metals could be used for forming a woven fabric-like screen. Structures other than woven wire could also be used.

FIG. 2, which is a vertical sectional view taken along line II—II of FIG. 1, illustrates the various layers of the blanket insulation. The ceramic fabric layer 12 is the outer-most layer and is referred to as the "outer mold line" (OML) fabric. This refers to the most upper outside facing hot surface layer (or was, prior to attachment of the screen and foil of the present invention).

A typical fabric for the ceramic fabric layer 12 is NEXTEL 440, Interlock type, consisting of three plies of fabric yarn with a yarn count of 93 per inch (warp) by 87 per inch (fill), ±10%. The fabric weighs 15.7 oz. per square yard, ±5% and has a thickness of 0.030 inches. This fabric, which is made from zirconium silicate fibers, is commercially available from 3M of St. Paul, Minn., USA. Other ceramic fabrics of similar construction and/or properties could be used.

A second ceramic fabric layer 18 is disposed on an opposite side of an insulation layer 20. After stitching, the insulation layer 18 is sandwiched between the two ceramic fabric layers 12 and 18. A typical fabric for layer 18 is NEXTEL 440, type Plain Weave, having a weight of 8 oz. per square yard. Other ceramic fabrics of similar construction and/or properties could be used.

The insulation layer 20, disposed between fabric layers 12 and 18, can be made of any suitable material, such as SAFFIL alumina insulation. SAFFIL is commercially available from Imperial Chemical Industries Ltd of Wilmington, Del., USA, and consists of 95% alumina and 5% silica. For purposes of the present invention, the insulation layer 20 can be any combination of flexible insulation materials such as those described in U.S. Pat. Nos. 5,038,693, 5,296,288 and 5,277,959, which are incorporated herein by reference. Preferably, the insulation layer 20 is in the form of a mat, and in the illustrated embodiment is 1.5 inches in thickness and weighs 3–4 pounds per cubic foot. The thickness is reduced to one inch by compression to arrive at a weight of 3–6 pounds per cubic foot.

Stitching The Sub-assembly

The alloy screen 10, OML fabric layer 12, insulation layer 20 and fabric layer 16 are stitched together using ceramic threads 22 and 24 which interlock in a lock-stitch sewing pattern. The outer thread 24 is made of NEXTEL 440, has a denier of 700, and has two ply twists per inch. Thread 22 is likewise made of NEXTEL but is wrapped at its opposite ends with a carrier yarn at 55 denier Rayon with 17 wraps per inch with an overwrap of Rayon or Dacron.

At first, the ceramic fabric layer 12, the insulation layer 20, and the ceramic layer 18 are stitched together using a stitch spacing of two inches. These layers, stitched together, form a sub-assembly. After stitching these layers together, the ceramic fabric layer 12 is heat cleaned.

Next, the metallic fabric layer 10 is attached to the sub-assembly, and in particular to the ceramic fabric layer 12 using a stitch spacing of two inches, the stitch lines lying in between the stitch lines of the sub-assembly stitching. After stitching, a second sub-assembly is formed from, consisting of the first sub-assembly and the attached metallic fabric layer 10. The second sub-assembly will have a pattern of one inch squares formed by the NEXTEL threads on its inner and outer surfaces.

Figure 3:
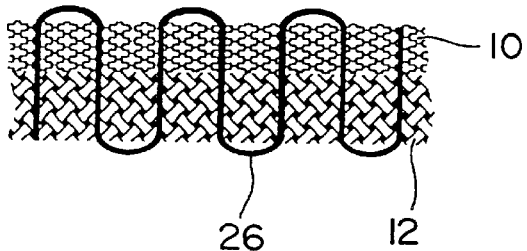
FIG. 3 is an enlarged view of a portion of a closeout extension of the flexible blanket insulation, taken from within the broken line circle of FIG. 1.

After forming the second sub-assembly, and as seen in FIG. 3, the closeout extension 16 is stitched with a single NEXTEL thread 26 to connect the metallic fabric layer 10 to the ceramic fabric layer 12. It may be possible to stitch the close-out extension 16 prior to form either the first or second sub-assemblies.

The stitch count for the lockstitching is preferably five per inch and the stitch pattern is square. stitching should conform to the requirements of FED-STD-751, Stitch 301, except that the thread loop interfacing 28 at the inner side is as described in U.S. Pat. Nos. 5,277,959 and 5,038,693.

A Singer class 7 extended arm double needle machine employing a shuttle-bobbin mechanism is used to make the lockstitch. This machine is used in conjunction with a specially designed puller device. The stitch type is a 301 lockstitch. The needle is a system 1000, size 300, with a modified tip and enhanced eye and scarf features.

Attaching The Metal Foil

After completion of the stitching steps, and as seen in FIG. 4, a metallic foil layer 30 is brazed to the metallic fabric layer 10. The foil layer 30 renders the blanket insulation more durable and resistant to water absorption than the insulations described in the incorporated references. The foil layer 30 is preferably made of a superalloy, such as INCONEL 601, which is a nickel-based superalloy. Other alloys or metals could be used. In the illustrated embodiment, the foil layer 30 is 0.002 inches in thickness.

Since the refractory metallic fabric layer 10 is sewn to the underlying insulation and fabric layers, bonding between the braze filler material and ceramic is not required as was the case in previous attempts to attach metal alloy foils to ceramic thermal protection systems. Since bonding between the braze alloy and ceramic is not required, conventional (as opposed to active) alloys can be used. Conventional braze alloys tend not to wet the ceramic surfaces, thereby minimizing adverse chemical and physical interactions. Typical brazing fillers and conditions are listed below in Table I:

TABLE I

Typical Braze Fillers

| AWS Designation | Commercial Designation | Composition Wt % | Solidus, °F. | Liquidus, °F. | Brazing Range, °F. |
|---|---|---|---|---|---|
| B Au-5 | | 30 Au, 34 Pd, 36 Ni | 2075 | 2130 | 2130–2250 |
| BV-Au-7 | | 50 Au, 25 Ni, 25 Pd | 2015 | 2050 | 2050–2110 |
| BV Au-8 | | 91–93 Au, 7–9 Pd | 2190 | 2265 | 2265–2325 |
| B Co-1 | | 52 Co, 17 Ni, 19 Cr, 8 Si, 4.0 W | 2050 | 2100 | 2100–2250 |
| B Cu-1 | | 100 Cu | 1981 | 1981 | 2000–2100 |
| B Cu-2 | | 85.6 Cu | 1981 | 1981 | 2000–2100 |
| BV Cu-1x | | 99.99 Cu | 1981 | 1981 | 2000–2100 |
| V Bu-1a | | 100 Cu | 1981 | 1981 | 2000–2100 |
| B Ni-5 | | 19 Cr, 0.03 B, 10 Si, 0.1 C, 70 Ni | 1975 | 2075 | 2100–2200 |
| | MHF 157 | 70 CO, 21 Cr, 4.5 W, 1.6 Si, 2.4 B | 2012 | 2200 | 2200–2250 |
| | MHF 6M | 60 Co, 27 Cr, 3 Fe, 2.5 B, 3.9 W, 2.9 Ni | 2066 | 2102 | 2102–2160 |

The above brazing alloys are commercially available in either paste, wire or foil form. These alloys must meet two essential conditions. First, the optimum brazing temperature must be lower than 2,300° F. so as to not damage the ceramic fabric. Each alloy has a solidus and liquidus bracketing the melting range and the optimum brazing temperature is typically within 100° F. above the liquidus. Second, the solidus temperature must be above the maximum temperature anticipated in service, approximately 2,000° F. in one example. An exclusive 2,000°–2,300° F. temperature range is thus imposed by these conditions.

The restrictions noted above limit the selection to only a few braze alloys, namely, those listed in Table I. The first nine fillers in Table I are standard grades, i.e., they have American Welding Society (AWS) designations. The next two are Allied Signal "metglas" designations, to which there are no equivalent AWS designations.

The brazing material listed in Table I is placed only on top of the OML metal alloy screen 10 at the center of each two inch square. The top foil layer 30 is placed on the blanket and weighted to achieve appropriate contact pressures. The entire assembly is then placed in a vacuum or inert gas brazing furnace and the assembly is brazed using procedures consistent with each brazing material shown in Table I.

Closing out of the Assembly

Figure 5:
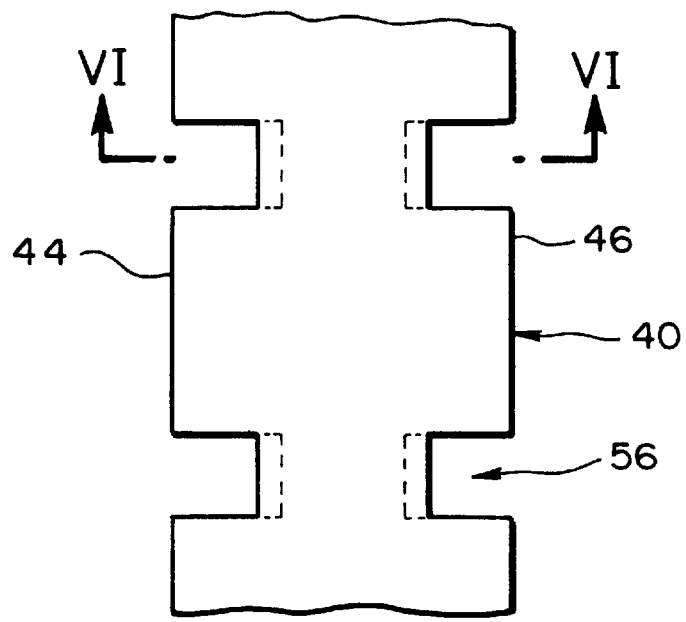
FIG. 5 is a partial top view of a ceramic frame member used in a snap on seal design for the closeout of a blanket insulation of the present invention.
Figure 6:
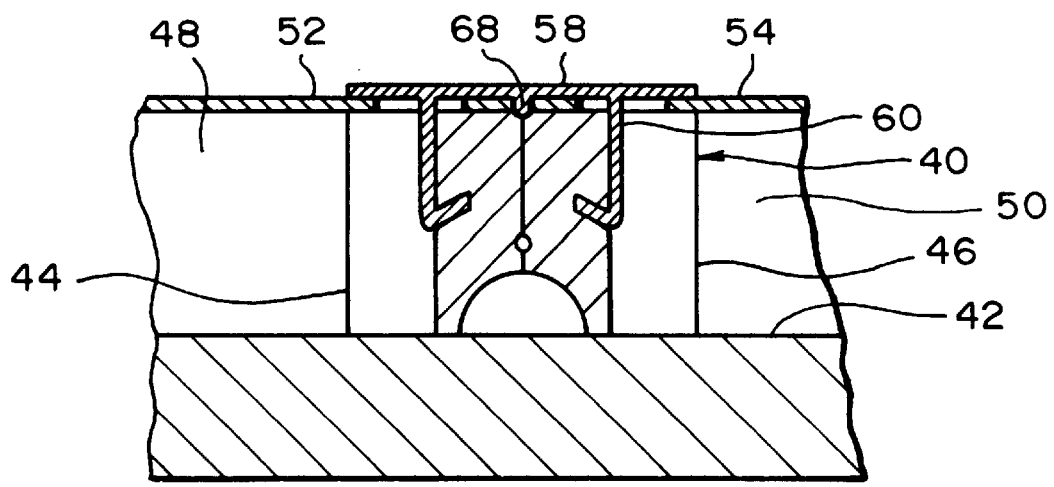
FIG. 6 is a sectional view taken along line VI—VI of FIG. 5, with the snap-on cover in place.
Figure 7:
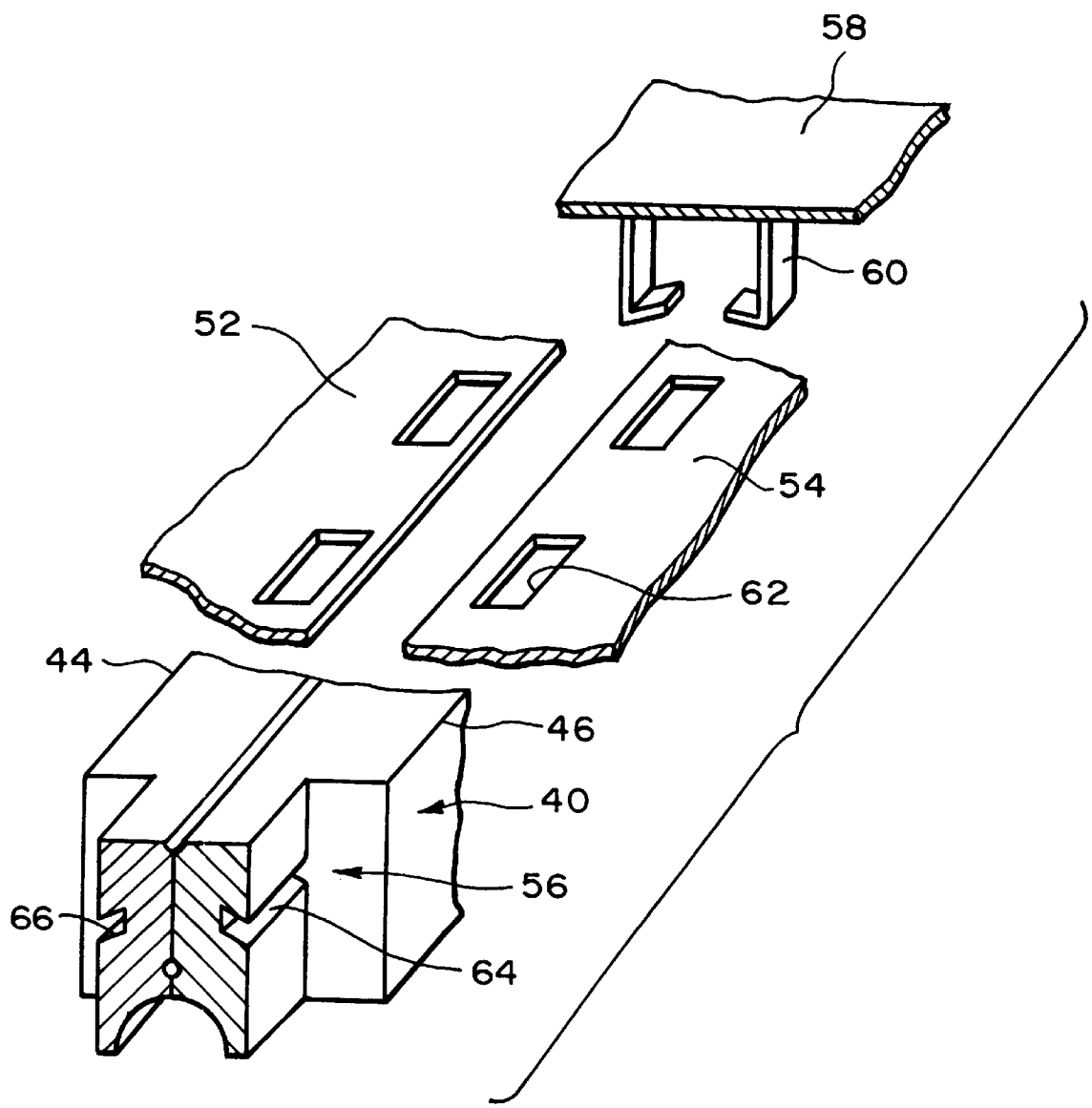
FIG. 7 is a partial exploded view of the snap on embodiment of FIGS. 5 and 6.

After brazing, the blanket is closed out in one of the different methods described below. In each method, a ceramic tile edge structure is connected to the structure being insulated, such as an aerospace structure (orbiter, satellite, rocket booster, etc.). Referring to FIGS. 5–7, a ceramic frame 40 is placed around the perimeter of the blanket. The ceramic frame 40 is preferably made of fibrous refractory insulation and is approximately 0.5 inches wide and its height is determined by the thickness of the blanket. The frame 40 may be made in sections, approximately six inches long and designed to permit flexing of the blanket on the perimeter without creating any gaps.

The ceramic frame is mechanically bonded to a surface 42 of an aeronautical structure or structure requiring insulation. In the embodiment of FIGS. 5–7, the frame members have opposite, parallel longitudinal edges 44 and 46, against which two adjacent sections of blanket insulation 48 and 50 abut, respectively.

The IML fabric is bonded to the bottom surface of the rigid insulation to permit stabilization of the close out tile. The top metal foil layers 52 and 54 of each blanket 48 and 50 is positioned so as to extend onto the top surface of the frame members, as shown in FIG. 6. The longitudinal edges 44 and 46 of the frame members are machined to form rectangular, opposed pairs of recesses, as shown in FIG. 5. The recess pairs are longitudinally spaced.

A snap-fitting cover 58 is provided with pairs of extending legs 60. The legs extend through corresponding rectangular openings 62 provided in the longitudinal edge portions of the foil layers 52 and 54, respectively. The legs 60 engage grooves 64 and 66 formed in opposite recesses 56 so as to secure the cover 58 over the edge portions of the foil layers 52 and 54. Both the cover and the foil layers are preferably made of 0.004 inch thick INCONEL. The blankets are thus sealed on the surface by snapping in the cover 58, which acts as a seal.

The frame members can be arranged in any suitable array for any particular application, but preferably, all sides of a blanket insulation will be bound by the ceramic tile frame members. The legs 60 are preferably brazed to the inner surface of the cover 58, but other suitable means may be employed for securing same. Also, a pin 68 may be brazed or otherwise connected to the inner surface of the cover 58 to provide indexing or positioning means for the cover 58.

The dimensions of the rectangular openings 62 are chosen such that the foil layers can expand freely as they receive their heat input. The dimensions of the rectangular recesses permit a flexibility which is derived from not supporting the cover plate over the length of the recesses. This is utilized to obtain positive pressure between the cover plate and the foil at all operating temperatures.

Thermal expansion of the cover plate in the length direction is accommodated by staggering. In this way one can decide, depending on the curvature of the vehicle, to use an appropriate number of snap-on seals in the length direction.

Figure 8:
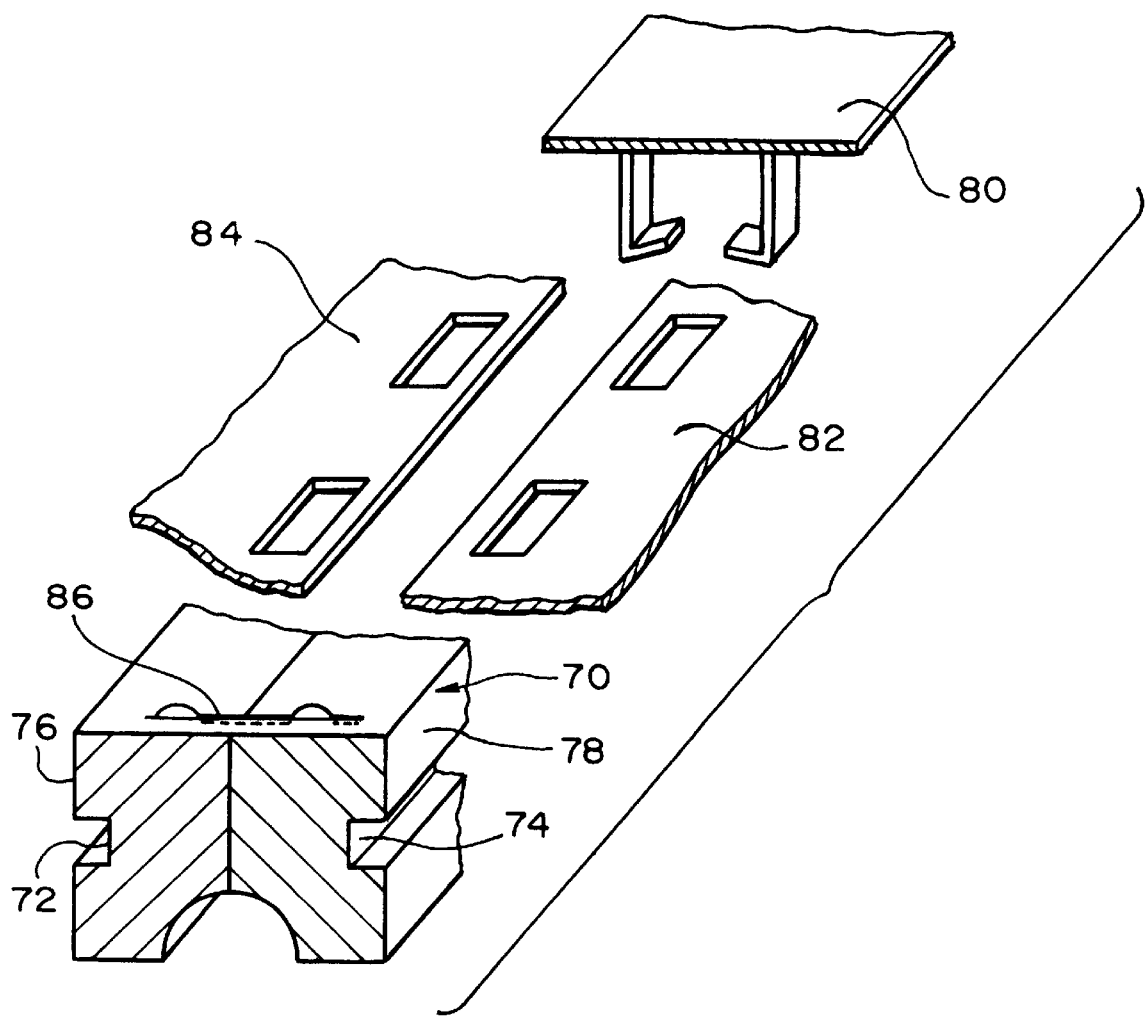
FIG. 8 is a partial exploded view of a variation of the embodiment of FIGS. 5–7.

An alternative embodiment is shown in FIG. 8, in which the ceramic frame 70, rather than having rectangular recesses formed therein, has slots 72 and 74 formed directly in the longitudinal edges 76 and 78, respectively. In other respects, the cover 80 functions in the same as in the FIG. 5 embodiment, with its legs passing through the openings in the foil layers 82 and 84. However, in order obtain positive pressure in this embodiment, a spring 86 is provided in the upper surface of the frame member 70, at longitudinally spaced intervals, if necessary. The springs provide pressure to the bottom of the cover plate 80.

Figure 9:
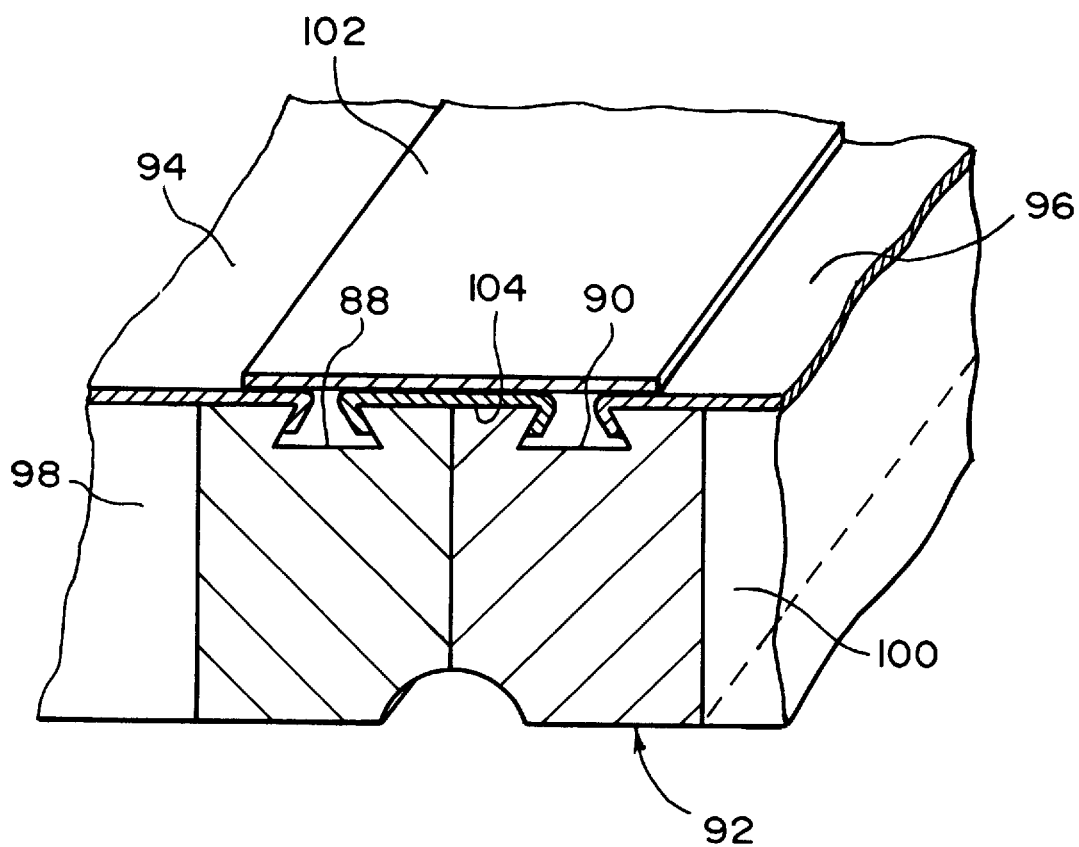
FIG. 9 is a partial perspective view, partially in section, of another variation of the embodiment of FIGS. 5–7.

In the embodiment of FIG. 9, two dove-tail slots 88 and 90 are formed in the upper surface of the ceramic frame member 92. The INCONEL foil layers 94 and 96 have longitudinal edges that are folded or bent to fit into the slots 88 and 90, respectively. As in other embodiments, the blanket insulations 98 and 100 abut the frame member 92 at opposite sides thereof.

A sealing plate or cover 102 has a clip 104 connected to its underside which fits into the slots 88 and 90. The clip 104 may run the full length of the cover 102 or may comprise any number of individual clips located at spaced intervals along the length of the cover. As in the other embodiments, the cover is made of INCONEL, or a comparable material, as is the clip 104, which can be brazed to the inner surface of the cover. This embodiment obviates the need for the rectangular openings that are provided in the other embodiments.

The clip 104 could be simplified by simply brazing or otherwise attaching inwardly directed fingers directly to the bottom of the cover 102. The fingers would fit into the dove-tailed slots and would be angled parallel to the inner surface of the slots.

Figure 10:
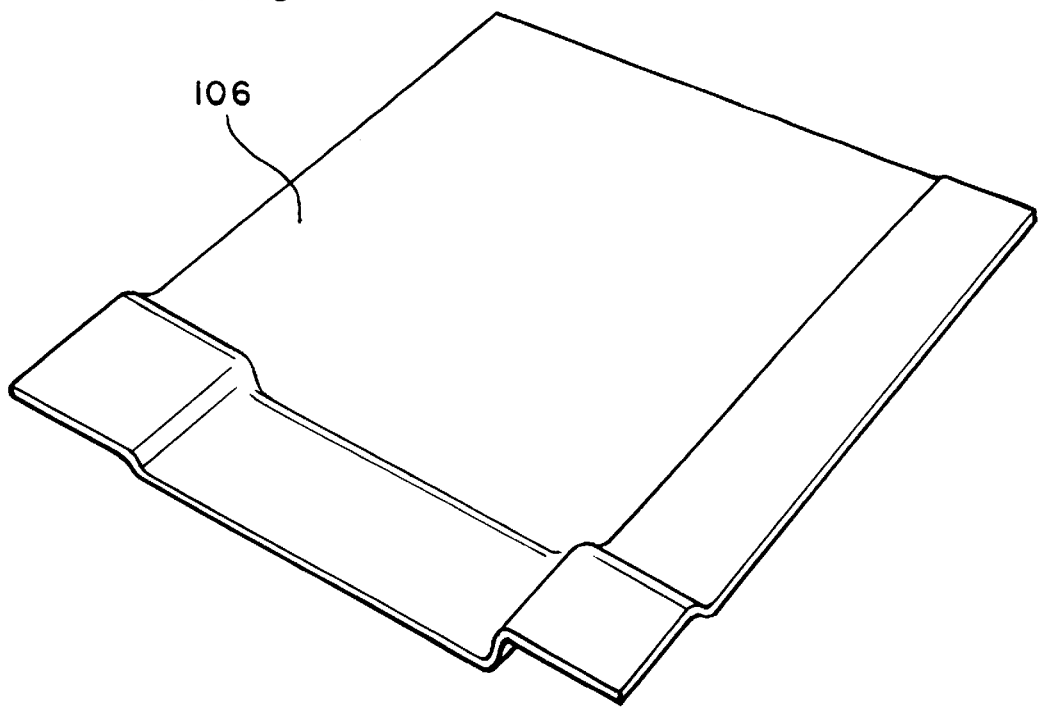
FIG. 10 is a top perspective view of a foil shingle according to the present invention.
Figure 11:
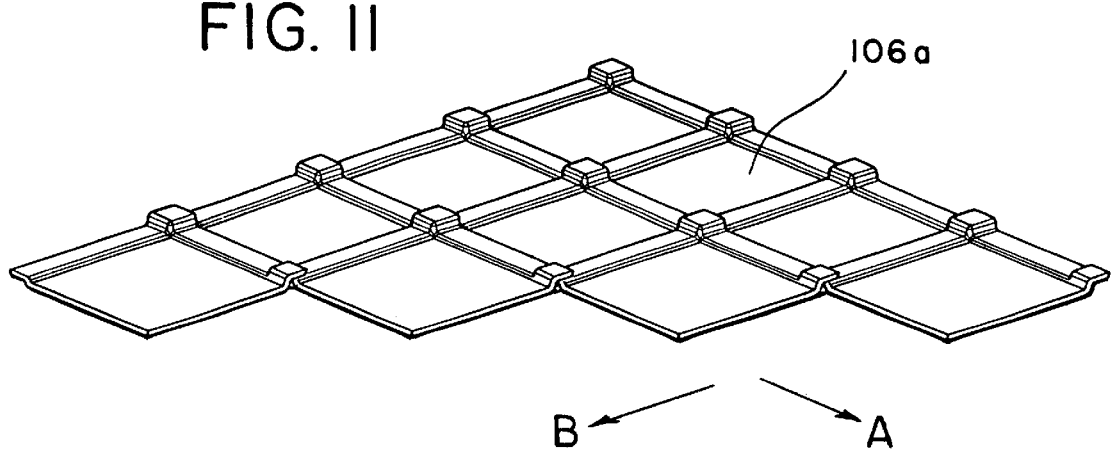
FIG. 11 is an array of interconnected foil shingles of the design of FIG. 10.

In the embodiment of FIG. 10, the same tile edge perimeter is placed as in the previous embodiments. However, the top foil 106 is formed into a form having a step and shoulder formations that facilitate a shingled arrangement between adjacent blanket insulations. This forms a shingle effect on top of the blanket with overlapping sides. As shown in FIG. 11, several foils 106a are arranged in a shingled array, with the individual panels being added first in the direction "A" and then in the direction "B".

Figure 12:
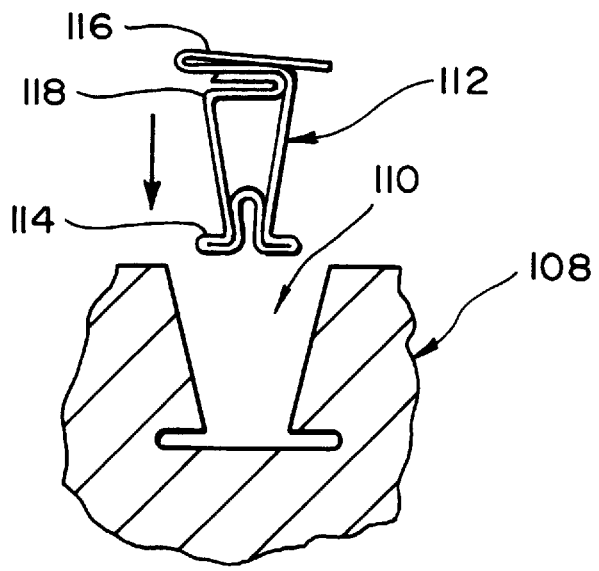
FIG. 12 is a partial sectional, exploded view of a spring clip and groove design for use in the ceramic frame and blanket combination of the present invention.
Figure 13:
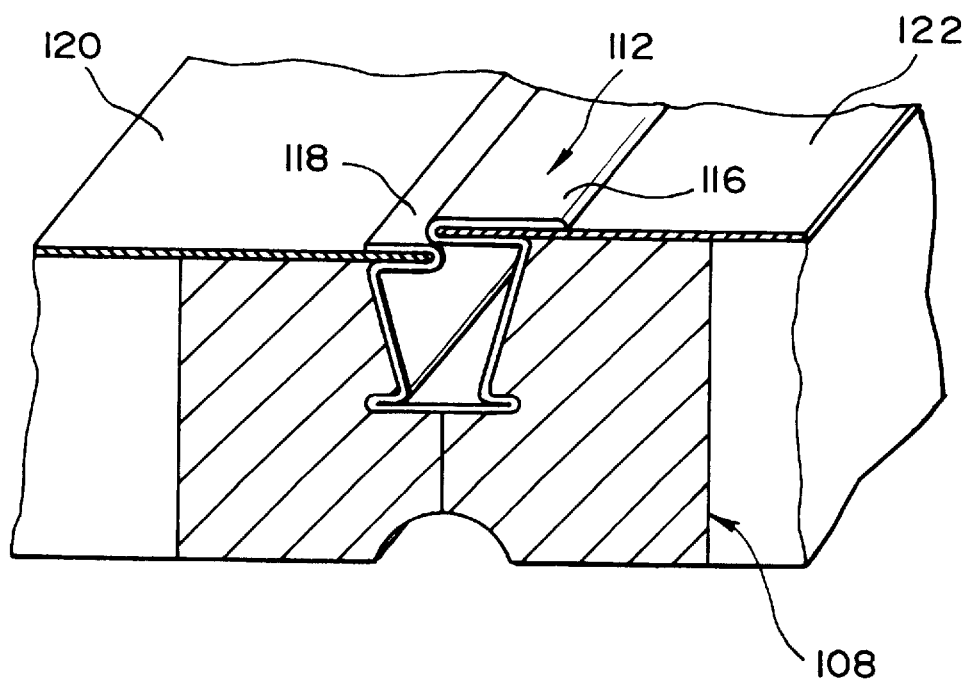
FIG. 13 is a partial perspective view, partiaally in section, of another variation of the embodiment of FIGS. 5–7.

In the embodiments of FIGS. 12 and 13, a ceramic tile frame or perimeter is formed around the blanket insulation as in the other embodiments. In each frame member 108, an inverted T-shaped slot 110 is formed. A spring clip 112 is placed into the slot 110 and the lower end thereof expands radially outwardly to interlock with the lower portion of the slot 110. The upper end of the spring clip 112 is provided with first and second horizontally elongated U-shaped receptors 116 and 118, which receive edge portions of foil layers 120 and 122. This retains the foil edges on the surface of the tile edge and permits the expansion of the foil during heating of the insulation. The space left in the slot 110 can be filled with insulative material, such as saffil.

Figure 14:
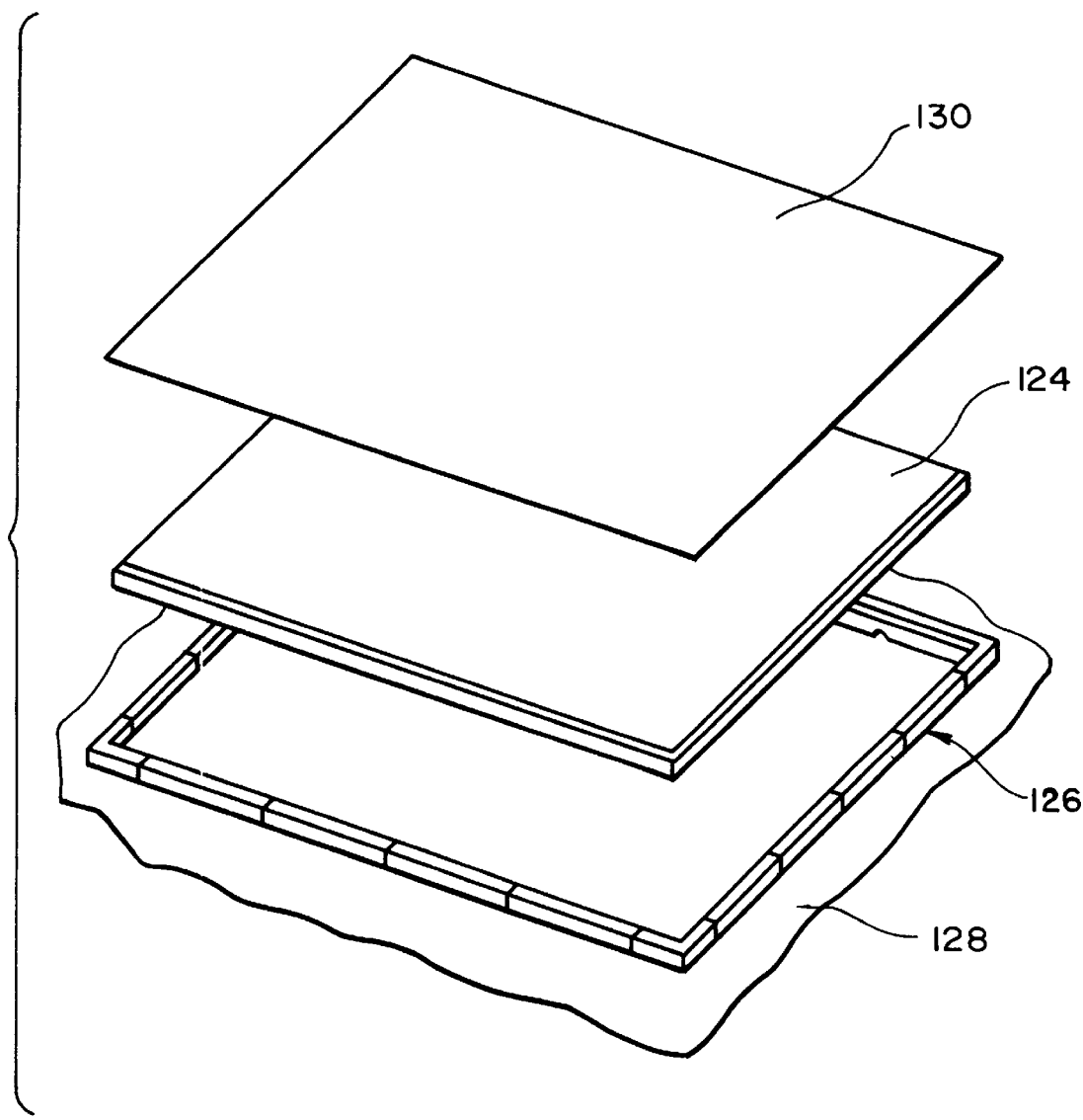
FIG. 14 is an exploded view showing a ceramic frame, blanket and foil of the present invention.

FIG. 14 illustrates a typical installation of a blanket insulation 124 placed in a ceramic frame 126, which is attached to a surface 128 of an aerospace structure. The foil layer 130 has edge portions which extend beyond the edge of the blanket insulation 124 for closing out according one of the aforementioned methods.

The new insulation blanket of the present invention is made generally of the same components as those described in U.S. Pat. Nos. 5,277,959 and 5,038,693, except that the multi-layer assemblies described in those patents are optional in the present invention depending on the heating environment. The present invention includes a metal alloy foil which is brazed onto a metal alloy screen which is attached to the surface of the blanket. The insulation blanket materials are quilted together with ceramic threads generally following the processes described in the aforementioned '959 and '693 patents, which are incorporated herein by reference.

The present invention is useful as a thermal protection system for specific heating environments which contain conductive, convective, and radiative heating components. In particular, this invention provides a hybrid metallic/ceramic insulation which provides a thermal protection system (TPS) of improved durability while still providing adequate thermal protection to structures subjected to multiple cycles of aeroconvective heating. This insulation is intended for use on the exterior surfaces of aerospace vehicles such as the proposed Single Stage To Orbit Vehicle (SSTO), where an all-weather TPS is required to protect the vehicle from the thermal environment. Generally, the invention is useful as an insulation for the spacecraft industry, and could also be used in the aircraft industry, for example, as insulation in aircraft engine nacelles.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A flexible blanket insulation comprising:
   an insulation layer having opposite sides;
   a ceramic fabric layer overlying one side of the insulation layer;
   a metallic fabric layer overlying the ceramic fabric layer;
   means for interconnecting the insulation layer, the ceramic fabric layer, and the metallic fabric layer; and
   a metallic foil layer brazed with a braze material to the metallic fabric layer.

2. A flexible blanket insulation according to claim 1, wherein the means for interconnecting includes a ceramic thread stitched through the metallic fabric layer, the ceramic fabric layer and the insulation layer.

3. A flexible blanket insulation according to claim 2, wherein the thread is stitched in a lockstitch pattern.

4. A flexible blanket insulation according to claim 1, wherein the metallic fabric is made of a woven wire.

5. A flexible blanket insulation according to claim 4, wherein the woven wire is made of a nickel-based alloy material.

6. A flexible blanket insulation according to claim 5, wherein the nickel-based alloy material has a plain weave pattern of 0.0031 inch diameter monofilament wire.

7. A flexible blanket insulation according to claim 6, wherein the metallic fabric layer is made from one of INCONEL 600, 601, 617, and 625 wire.

8. A flexible blanket insulation according to claim 1, wherein the metallic foil layer is made of a nickel-based alloy material.

9. A flexible blanket insulation according to claim 1, wherein the insulation layer is a mat made of ceramic material.

10. A flexible blanket insulation according to claim 1, wherein the ceramic fabric layer is a three-ply interlock design of aluminoborosilicate fabric, wherein the three plies are interlocked in a pattern of interweaving one ply with the second and third ply.

11. A flexible blanket insulation according to claim 1, wherein the braze material has a liquidus temperature which is within approximately 100° F. above the brazing temperature, and wherein the brazing temperature is less than 2,300° F.

12. A flexible blanket insulation according to claim 1, further comprising a second ceramic fabric layer overlying the opposite side of the insulation layer.

13. A flexible blanket insulation according to claim 1, wherein the ceramic fabric layer incudes at least three interlocked layers of aluminoborosilicate fill yarn, having a denier of between 600 and 1,000 and 200 filaments per tow, and wherein the yarn count is from 88 to 91 per inch for fill.

14. A flexible blanket insulation according to claim 1, wherein the ceramic fabric layer is from 15 to 16.4 ounces per yard and the thickness of the fabric is between 0.022 and 0.027 inches.

* * * * *